Aug. 18, 1942.　　　W. C. CALVERT　　　2,293,589
PACKAGE
Filed Sept. 23, 1936

Inventor
William C. Calvert
By
Attorney

Patented Aug. 18, 1942

2,293,589

UNITED STATES PATENT OFFICE 2,293,589

PACKAGE

William C. Calvert, Chicago, Ill., assignor to Wingfoot Corporation, Wilmington, Del., a corporation of Delaware Application September 23, 1936, Serial No. 102,224

3 Claims. (Cl. 229—14)

This invention relates to a new package in which a rubber hydrohalide is employed and in which the rubber hydrohalide is covered with an opaque material or otherwise protected from decomposing light rays.

The rubber hydrohalides such as rubber hydrochloride, rubber hydrobromide and rubber hydroiodide are decomposed by light. They last practically indefinitely when kept in the dark. Calvert U. S. Patent 1,989,632 discloses photochemical inhibitors which may be added to the rubber hydrohalides to stabilize them. The rubber hydrohalide used in the package of this invention may be stabilized with a photochemical inhibitor although the use of a photochemical inhibitor is not essential to the invention and unstabilized rubber hydrohalides may be employed.

Although the invention includes other rubber hydrohalides such as rubber hydrobromide it will be described more particularly as applied to rubber hydrochloride.

This application is in part a continuation of my copending applications 685,411 filed August 16, 1933 which is now U. S. 2,167,634; 696,687, filed November 4, 1933; 755,389, filed November 30, 1934 which is now U. S. 2,274,588; 173 filed January 2, 1935 (which in turn is a continuation of my application 652,686, filed January 20, 1933); 12,026 filed March 20, 1935; and 31,091 filed July 12, 1935 (which in turn is a continuation of applications 173 filed January 2, 1935; 652,686 filed January 20, 1933; 685,411 filed August 16, 1933; 696,687 filed November 4, 1933; and 755,389 filed November 30, 1934); and 683,293 filed Aug. 2, 1933, which is now 2,168,015.

Rubber hydrochloride has been known for a long time. Prior to my invention it was never employed in packages. It has many properties which make it particularly desirable for such use. It is extremely moisture-resistant and a thin flexible pellicle of rubber hydrochloride, particularly a plasticized rubber hydrochloride, may be creased and flexed without reducing its moisture resistance. It is water-proof and likewise resistant to acids, alkalis, oils, and greases, etc. It is non-toxic and odorless and is therefore particularly desirable for the packaging of food stuffs. It may be used for packaging lubricating oils and likewise inedible oils and greases and fats including lubricating materials and likewise edibles such as lard and butter. It may be used for packaging alcohol, glycerin, ethylene glycol, milk, mustard, mayonnaise, fruits, vegetables, drugs, chemicals and dry materials of a corrosive or hygroscopic nature and a great variety of other materials. A thin pellicle of the rubber hydrochloride, or paper or cloth, etc., coated with rubber hydrochloride may be employed to enclose the material. Or rubber hydrochloride may be used in only a portion of the package to render it moisture-proof, etc. According to this invention the rubber hydrochloride is protected from the decomposing rays of the sunlight and preferably by an opaque covering. Transparent material colored with almost any yellow dyestuff may be used to protect the rubber hydrochloride although the total exclusion of light is preferred. In certain types of packages it may be desirable to have some material other than rubber hydrochloride in contact with the material to be packaged. In this event the rubber hydrochloride is incorporated in the package in the most advantageous manner.

The invention will be illustrated in connection ith the accompanying drawing, in which Fig. 1 shows a milk bottle cap.

Figure 1:
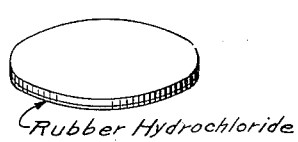
Figure 2:
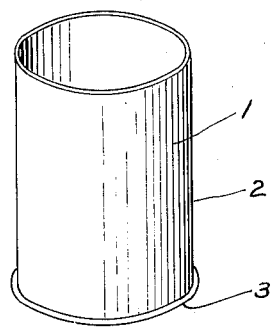
Figs. 2–7 illustrate steps in the formation of the package shown in Fig. 8.

The material to be packaged may be entirely enclosed in rubber hydrochloride although this is not essential. For example, in bottled goods only the opening of the bottle need be closed or protected with rubber hydrochloride. The paper cap used to close a bottle such as a milk bottle may be coated on the undersurface to prevent the contents of the bottle from coming in contact with the paper of the cap. A suitable cap is shown in Fig. 1. A milk bottle filled with milk and closed with a cap of this type is illustrative of the invention since the paper of the cap prevents the sun's rays from reaching the rubber hydrochloride from above and the milk itself protects the rubber hydrochloride from the sun's rays below. Some type of rubber hydrochloride closure is desirable in the bottling of a variety of materials in which the material itself protects the rubber hydrochloride from the sun's rays. The bottle may be made of colored glass to protect the rubber hydrochloride and possibly also the contents of the bottle from the sun's rays, or the bottle may be wrapped in an opaque or suitably colored material.

The rubber hydrochloride may be prepared as described in my Patent 1,989,632. The photochemical inhibitor there described may be omitted from the rubber hydrochloride used in carrying out the present invention, although hexamethylene tetramine or some other photochemical inhibitor may be used. A flexible rubber hydrochloride will ordinarily be preferred. The rubber hydrochloride may be plasticized with any suitable plasticizer such butyl stearate, dibutyl phthalate, tri butyl phosphate, chlorinated paraffin, halowax, arochlors (chlorinated diphenyls), chlorinated mineral oil, mineral oil, paraffin, ceresin, etc. For some purposes rubber hydrochloride plasticized with 2% of butyl stearate and one percent of paraffin will be found very satisfactory. For many packages the rubber hydrochloride may be used in the form of a pellicle and for many packaging operations paper or cloth, etc. coated with rubber hydrochloride will be desirable. Paper or cloth coated with a preformed sheet of rubber hydrochloride such as the laminated sheet described in my application 696,687 will be found desirable for many purposes. The rubber hydrochloride may be applied to the base in solution in a volatile solvent, if preferred. A pellicle of a flexible rubber hydrochloride or a flexible base coated with a flexible rubber hydrochloride film, plasticized if desired, may be flexed and creased without injuring the rubber hydrochloride so long as the rubber hydrochloride is kept away from the decomposing rays of the sunlight. Tests have shown that generally speaking, the light rays which embrittle rubber hydrochloride made according to my U. S. Patent 1,989,632 are shorter than 4000 or 4500 Angstrom units. By shielding rubber hydrochloride from light rays the rubber hydrochloride whether in pellicle form or applied to a base will remain flexible over a prolonged period of time.

Rubber hydrochloride is thermoplastic and heat-sealable. A bag suitably formed from a pellicle of rubber hydrochloride may be sealed by the mere application of heat and pressure. Heating in the neighborhood of 110° C. will ordinarily be satisfactory although the heat required will depend on the thickness of the pellicle, the plasticizers employed, etc. The bag may be formed by heat-sealing pellicles of rubber hydrochloride around the edges or the edges may be united with any suitable adhesive. A solvent for the rubber hydrochloride may be employed. The seam formed by heat sealing is moisture-proof and where moisture-proofness is desired seams formed by coalescence of the rubber hydrochloride will ordinarily be preferred. Bags formed in any manner may advantageously be closed by heat-sealing. This is a rapid method of packaging because the heat-sealed bag may be immediately enclosed in an outer container. No drying time is required and there is no evaporation of solvent which in the packaging of food stuffs and other materials is undesirable. Similarly paper or cloth coated with rubber hydrochloride may be formed into bags for the packaging of foodstuffs, oils, and other materials. The exterior of the bag need not be coated with rubber hydrochloride as an inner coating is all that is required. Instead of paper or cloth an open mesh fabric may at times be preferred for strengthening the rubber hydrochloride and this may be laminated to a pellicle of the rubber hydrochloride by an adhesive, solvent or by heat. A pellicle so strengthened is described and claimed in my copending application Serial No. 696,687. Bags made of paper, cloth, mesh or the like with a coating of rubber hydrochloride may advantageously be closed by heat-sealing. Liquids, emulsions, pastes, paps, pulps, gruel-like materials, soft jellies, dry powdery materials and the like may advantageously be packaged in bags made from a pellicle of the rubber hydrochloride or paper coated with such a pellicle and the bag containing the material may then be enclosed in a form-retaining, light-excluding container. This container may be of any suitable design but is preferably a fibrous material and constructed in any usual way. It may be square or any desired shape. A cylindrical fibrous container which may have metallic ends has been found suitable. The bag may be inserted in the container before being filled or it may first be filled and then put in the container. The bag may be formed by folding a square or oblong pellicle of the rubber hydrochloride and then heat-sealing along the edges adjacent to the fold leaving the third edge open. Careful heat-sealing gives a bond as strong as the film itself and a flat bag formed in this manner may be used in a cylindrical container. The bag may be formed in other ways. Such a package may be made in the manner described and claimed in my copending application 12,026 filed March 20, 1935.

Figure 3:
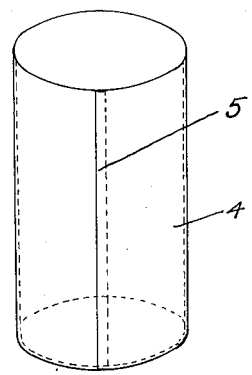
Figure 4:
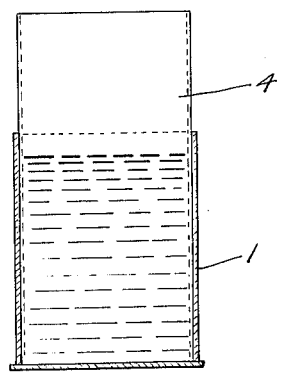
Figure 5:
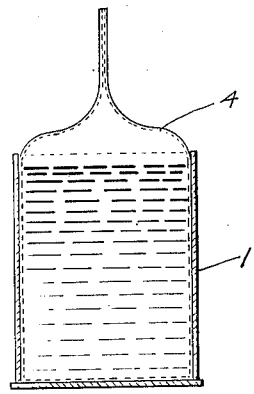
Figure 6:
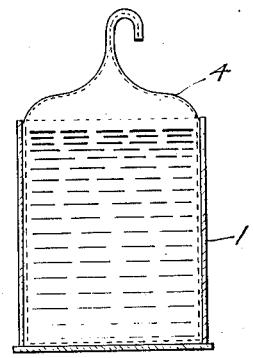
Figure 7:
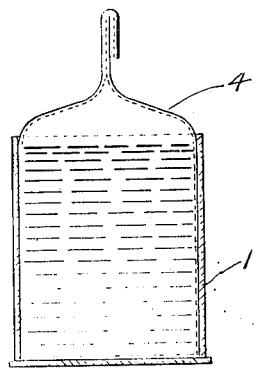
Figure 8:
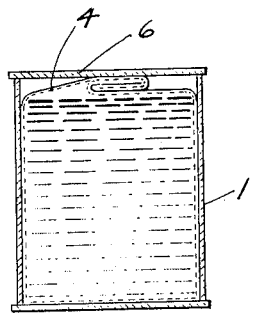

A package of this type is shown in Fig. 8 and steps in the formation of the package are shown in Figs. 2–7. The outside container 1 is of a usual type comprising fibrous side walls 2 and a metal bottom 3. The bag shown in Fig. 3 is formed by heat-sealing a disc of rubber hydrochloride into the bottom of the cylinder 4 made by uniting the ends of an oblong pellicle of rubber hydrochloride along the seam 5 by heat. This open bag is then inserted in the container. This is shown in Fig. 4. It is advantageous to employ a bag which is somewhat longer than the outside container. The bag is then filled. Before sealing it is advantageous to remove most of the air by raising the top of the bag. The bag is then sealed in any suitable way. An adhesive, which may be chloroform or other solvent for the rubber hydrochloride may be used, or it may be heat-sealed. This may be done by flattening the top of the bag as shown in Fig. 5, and sealing. The top may be folded over as shown in Fig. 6. This may be heat-sealed as shown in Fig. 7 by a suitable heated clamp or by passing it between rollers or any other suitable means for applying heat with pressure. The sealed top of the bag is then pushed down into the container as shown in Fig. 8 and the top 6 which may be a metallic top is fastened on the container.

In packaging solid materials such as a quarter pound or one pound print of butter, the sides of which are all squares or rectangles, a pellicle may be used and then, without sealing the rubber hydrochloride to form a tight package, it may be wrapped in an opaque material such as paper or the like to protect the rubber hydrochloride from the decomposing rays of the light.

The interior of a stiff form-retaining container may be coated with rubber hydrochloride and if the container is opaque this will protect the rubber hydrochloride from the decomposing rays of the light. If it does not exclude light rays shorter than about 4500 Angstrom units it must be enclosed with some opaque or light-excluding material to protect the rubber hydrochloride, according to this invention. The rubber hydrochloride may be applied to the interior of the container by spraying or brushing a solution of the rubber hydrochloride onto the interior, or a pellicle of rubber hydrochloride may be employed for this purpose. The container may be made entirely of fibrous material such as a cardboard material which may be sufficiently flexible for fabrication or only the upright walls of the container may be made of such material and the ends closed by metal such as tin, iron or steel. In such a structure the joint between the upright walls and the metal portion may be made tight by the application of a solution of rubber hydrochloride or by placing a pellicle of rubber hydrochloride over the joint or in any other desired manner. A preferred form of the invention is a container made from a single sheet of flexible fibrous material, the interior of which is coated with rubber hydrochloride. The rubber hydrochloride is advantageously applied to the flexible material before folding it into the form of the container. The seams may be made tight with rubber hydrochloride or in any other suitable manner. The material to be packaged may be placed directly in such a container without first enclosing it in a bag as above described. A container made of fibrous material, coated on the inside with rubber hydrochloride may be used for packaging candy, butter or greasy materials such as lard, etc.

A container of the type described and shown in my copending application Serial No. 755,389, filed November 30, 1934, may be employed. The fibrous walls may be formed into a cylinder and the inner surface of the cylinder coated with rubber hydrochloride by spraying or brushing or by the application of a thin pellicle of the rubber hydrochloride thereto. The pellicle may be united to the fibrous walls by heat and pressure or by the use of any suitable adhesive which may be a solvent for the rubber hydrochloride. The inner wall of the cylinder may be coated before it is formed into the cylinder. In this case the seam which necessarily results may be made tight by covering it with a pellicle of rubber hydrochloride or by treating with a solution of rubber hydrochloride. The rubber hydrochloride at the seam may be used to bind overlapping portions of the cylinder together by heating it to a sufficient temperature to render it tacky, using sufficient pressure to form a good bond. Such a cylinder with top and bottom made of metal disks suitably united to the cylinder may be used for packaging dry materials and various liquids, pastes and jellies, etc. Handles and spouts may be affixed in any suitable way. Where this involves exposing on the interior of the package any surface which is not protected with rubber hydrochloride this may be suitably treated with rubber hydrochloride for protection.

Figure 9:
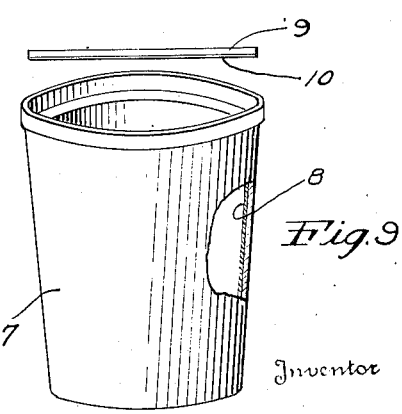
Fig. 9 shows a fibrous container coated on the interior with rubber hydrochloride.

A container suitable for packaging butter, ice cream, cottage cheese, peanut butter and the like is shown in Fig. 9. The stiff fibrous box 7 may be made in any suitable way. It is coated on the interior with rubber hydrochloride 8 which may be applied by spraying the interior of the box after it has been fabricated. The cover 9 is coated on the under side with rubber hydrochloride 10. This may advantageously be applied to the cover as a film. The cover when pressed into the top of the container is held in place by friction. Metal containers, etc. may be coated on the interior with rubber hydrochloride to protect them from chemicals, etc. which they contain. In turn, the metal protects the rubber hydrochloride from light rays which decompose the rubber hydrochloride. Wooden containers, such as butter tubs, etc. may advantageously be coated on the interior to protect the wood and also to protect the contents from absorbing materials from the wood which affect the taste, etc. of the contents.

It will thus be seen that the packages of this invention comprise packages of many different designs. They include packages with a lining of rubber hydrochloride and packages which comprise an enclosure formed from a rubber hydrochloride pellicle. Preferably they comprise a tight rubber hydrochloride enclosure which may be formed from a pellicle of rubber hydrochloride or material coated with rubber hydrochloride which is made tight by heat-sealing contacting surfaces of rubber hydrochloride or by coalescing such surfaces with a rubber hydrochloride solvent or by the use of a suitable adhesive. The type of adhesive employed will depend upon the use to which the package is to be put. A package for lubricating oil may require a different adhesive from a moisture-tight package for foodstuffs. However, the rubber hydrochloride need not necessarily enclose the material to be packaged. It may merely form a closure for a bottle or other vessel. On the other hand the vessel itself may be made from material which includes a thin layer of rubber hydrochloride such as a cylindrical fibrous container which is closed at the ends with metal or other moisture-proof material which does not contain or has not been treated with rubber hydrochloride. In all such structures the rubber hydrochloride is protected from decomposing light rays, preferably by an opaque material, although any material which filters out or screens the material from decomposing light rays may be employed.

Although the invention has been described more particularly as applied to a partially saturated, non-tacky, flexible rubber hydrochloride it includes other hydrochlorides including halogenated hydrohalides such as a rubber hydrochloride which has been chlorinated or brominated.

I claim:

1. A package, the packaging material of which comprises a flexible rubber hydrohalide film which becomes brittle on exposure to light and, as an integral part of the package, a covering for said rubber hydrohalide which screens out decomposing light rays.

2. In a package, an enclosure of rubber hydrochloride film which becomes brittle on exposure to light united to a flexible, opaque supporting material, said composite sheet being arranged with the rubber hydrochloride toward the contents of the package and the opaque supporting material toward the exterior of the package, whereby the rubber hydrochloride encloses and protects the contents of the package and the opaque material encloses and protects the rubber hydrochloride from decomposing light rays.

3. A unitary package comprising contents, a surrounding enclosure for said contents composed of a flexible, self-sustaining rubber hydrochloride film which becomes brittle on exposure to light and, as an integral part of said package but separate from said film, a surrounding enclosure for said rubber hydrochloride composed of a light-excluding material.

WILLIAM C. CALVERT.

CERTIFICATE OF CORRECTION.

Patent No. 2,293,589.                                   August 18, 1942.

WILLIAM C. CALVERT.

It is hereby certified that error appears in the printed specification of the above numbered patent requiring correction as follows: Page 1, first column, line 49, for "inedible" read --edible--; page 3, second column, line 40, for "hydrochlorides" read --hydrohalides--; and that the said Letters Patent should be read with this correction therein that the same may conform to the record of the case in the Patent Office.

Signed and sealed this 22nd day of September, A. D. 1942.

Henry Van Arsdale, (Seal)                              Acting Commissioner of Patents.